United States Patent
Chang

[11] Patent Number: 6,058,804
[45] Date of Patent: May 9, 2000

[54] CRANKSET DEVICE OF A TOY VEHICLE

[76] Inventor: Pi-Cheng Chang, 101-1, Chang Ho Rd., Chang Hua, Taiwan

[21] Appl. No.: 09/116,687

[22] Filed: Jul. 16, 1998

[51] Int. Cl.[7] .............................. G05G 1/14; F16C 35/06
[52] U.S. Cl. ......................... 74/594.1; 384/545; 403/348
[58] Field of Search ................ 74/594.1, 594.2; 384/545; 403/348, 349, 350, 383

[56] References Cited

U.S. PATENT DOCUMENTS

| | | | |
|---|---|---|---|
| 582,750 | 5/1897 | Leaycraft | 74/594.2 |
| 2,939,238 | 6/1960 | Ertel et al. | 403/383 |
| 3,551,004 | 12/1970 | Quisenberry | 74/594.1 |
| 4,331,043 | 5/1982 | Shimano | 74/594.2 |
| 4,406,504 | 9/1983 | Coenen et al. | 384/545 |
| 4,893,426 | 1/1990 | Bixler | 403/348 |
| 4,966,419 | 10/1990 | Cunard | 74/594.1 |
| 5,002,407 | 3/1991 | Chi | 384/545 |
| 5,464,300 | 11/1995 | Crainich | 403/348 |
| 5,494,341 | 2/1996 | Cheng | 403/348 |
| 5,722,574 | 3/1998 | Pratt | 403/349 |

FOREIGN PATENT DOCUMENTS

102101 of 1916 United Kingdom ................. 74/594.1

*Primary Examiner*—David A. Bucci
*Assistant Examiner*—Chong H. Kim
*Attorney, Agent, or Firm*—Alan Kamrath Oppenheimer Wolff & Donnelly LLP

[57] ABSTRACT

A crankset device has a chain ring, a tube connected to the chain ring, the tube having a hollow interior, and a crank arm passing through the chain ring, the hollow interior, an elastic washer, an annular retainer, and an annular cover. The crank arm has two protrusions. A first collar set surrounds the crank arm. A second collar set surrounds the crank arm. The first collar set is disposed in a first end portion of the tube. The second collar set is disposed in a second end portion of the tube. The annular cover covers the second end portion of the tube. The annular retainer is inserted in the annular cover. The elastic washer is disposed between the second collar set and the annular retainer.

3 Claims, 9 Drawing Sheets

CRANKSET DEVICE OF A TOY VEHICLE

BACKGROUND OF THE INVENTION

The present invention relates to a crankset device of a toy vehicle. More particularly, the present invention relates to a crankset device which can be assembled easily.

Figure 1:
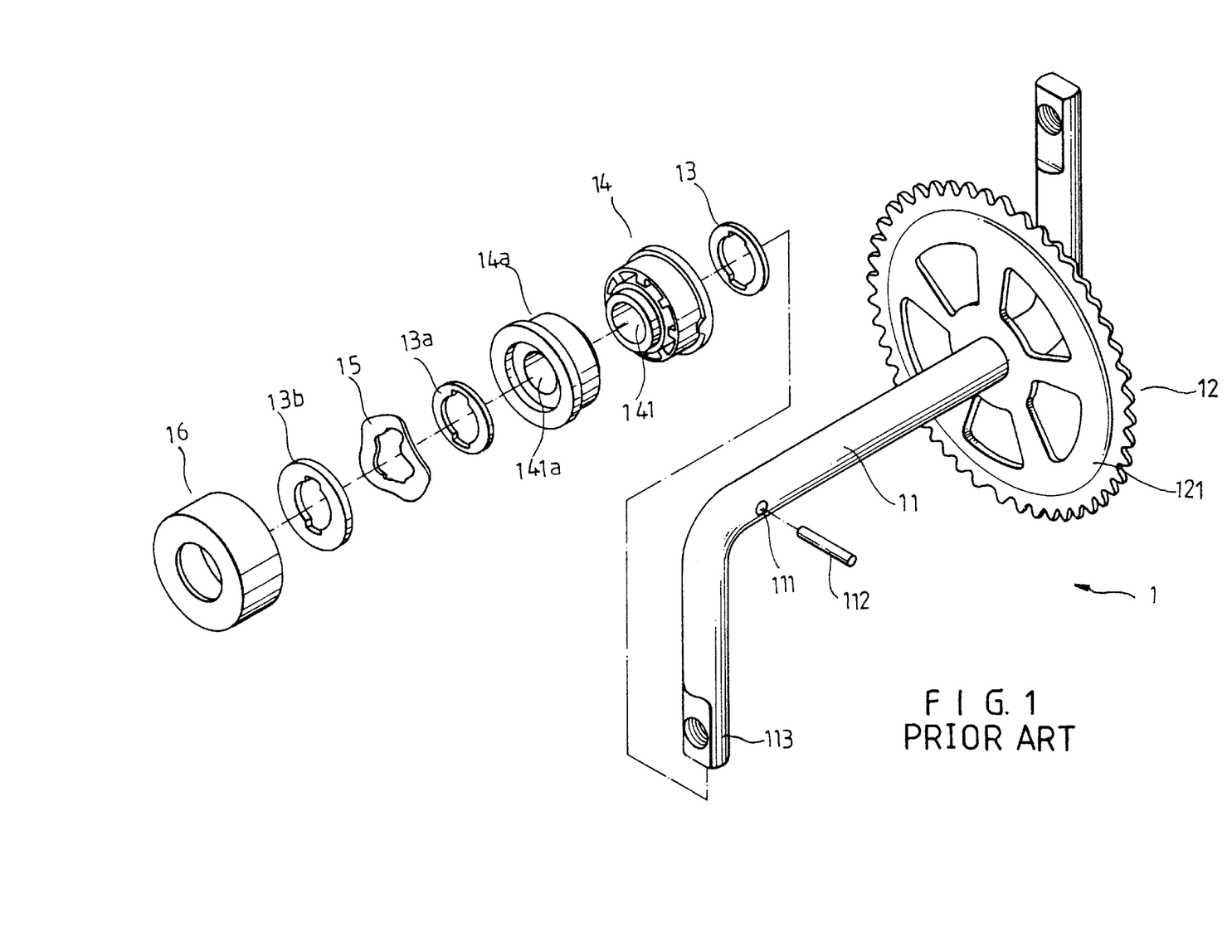
FIG. 1 is a perspective exploded view of a crankset device of a toy vehicle of the prior art.
Figure 2:
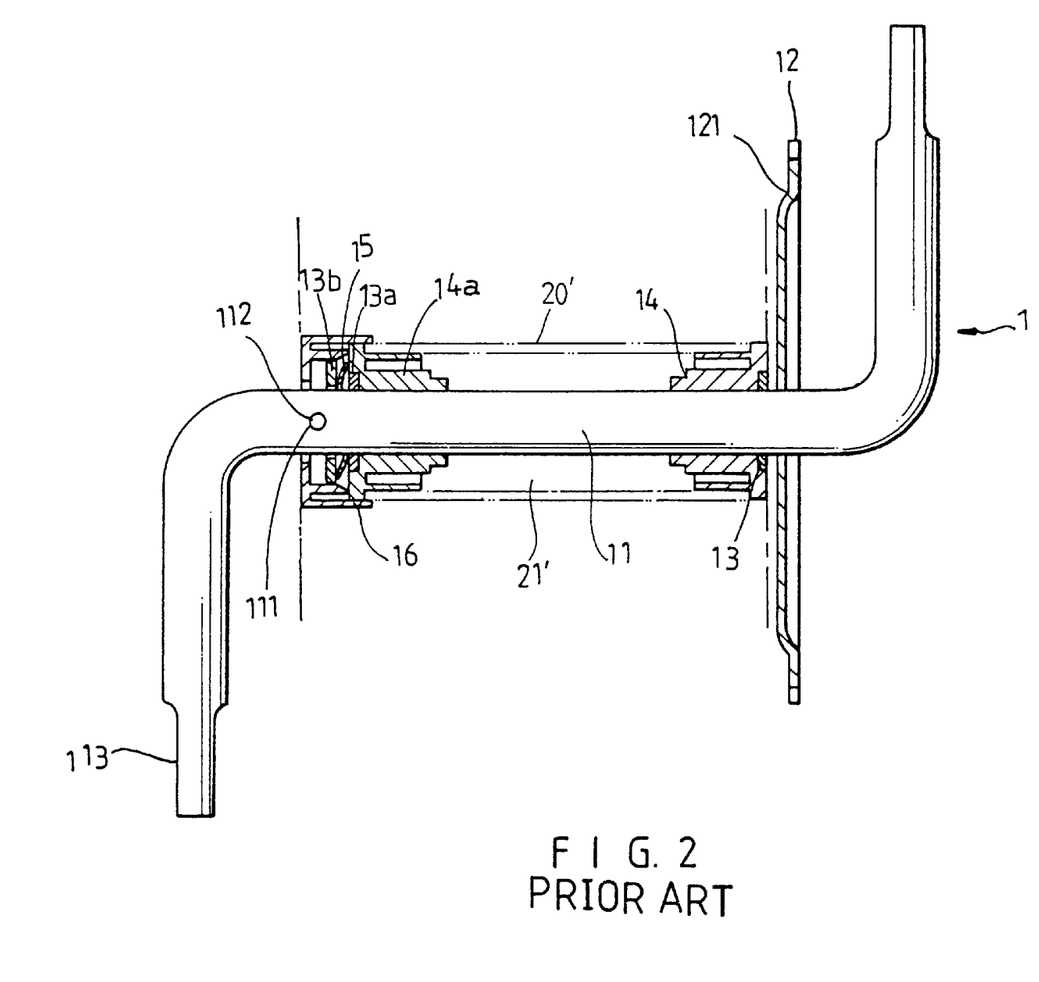
FIG. 2 is a sectional assembly view of a crankset device of a toy vehicle of the prior art.
Figure 3:
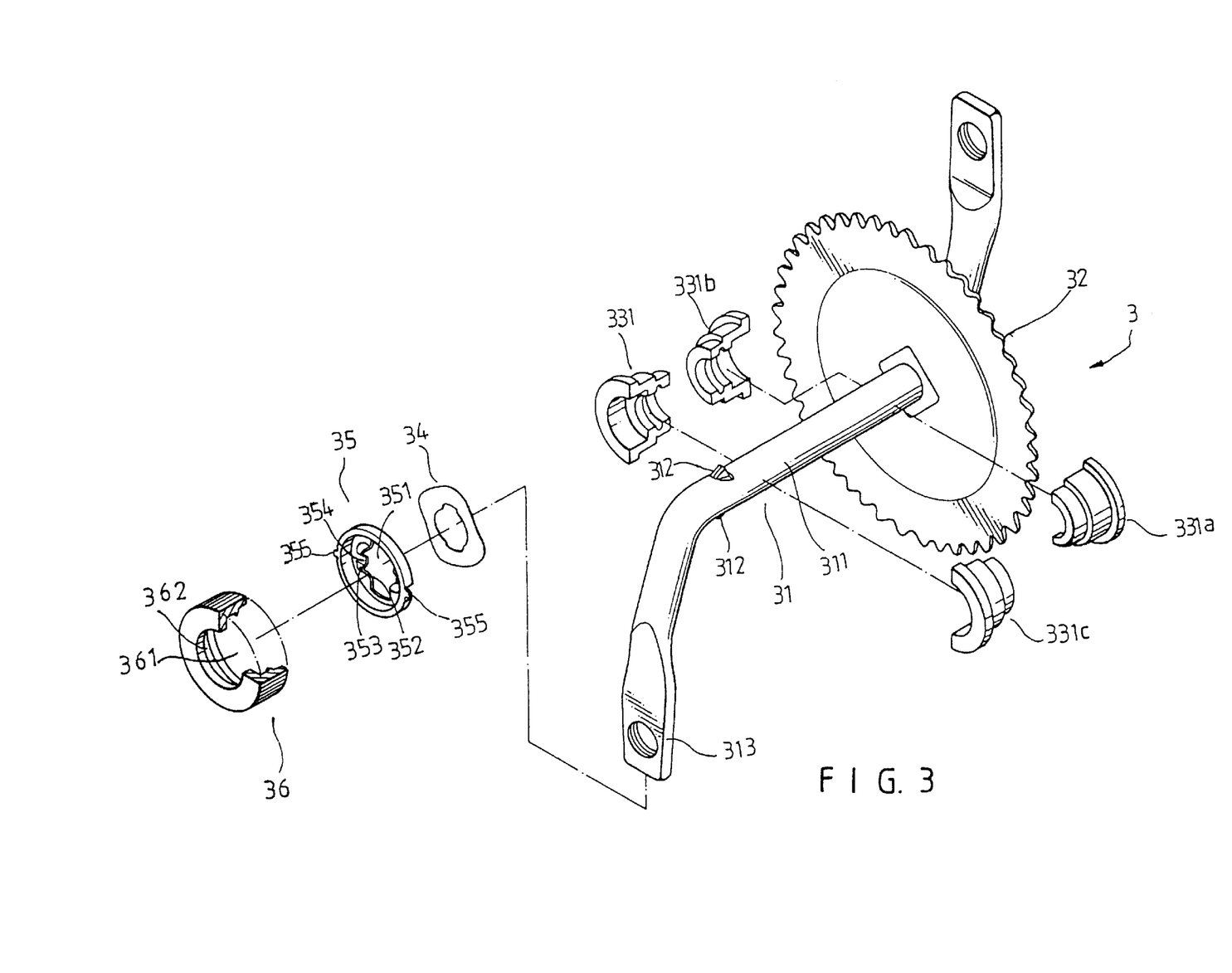
FIG. 3 is a perspective exploded view of a crankset device of a toy vehicle of a first preferred embodiment in accordance with the present invention.
Figure 4:
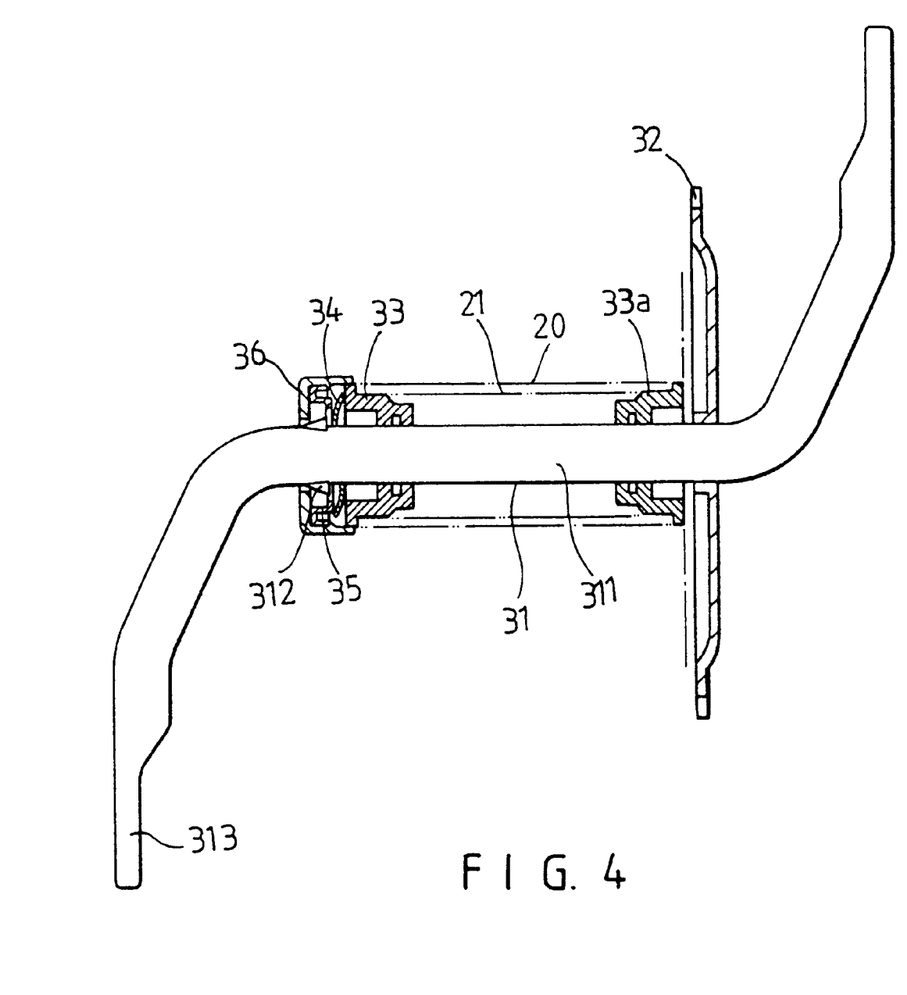
FIG. 4 is a sectional assembly view of a crankset device of a toy vehicle of a first preferred embodiment in accordance with the present invention.
Figure 5:
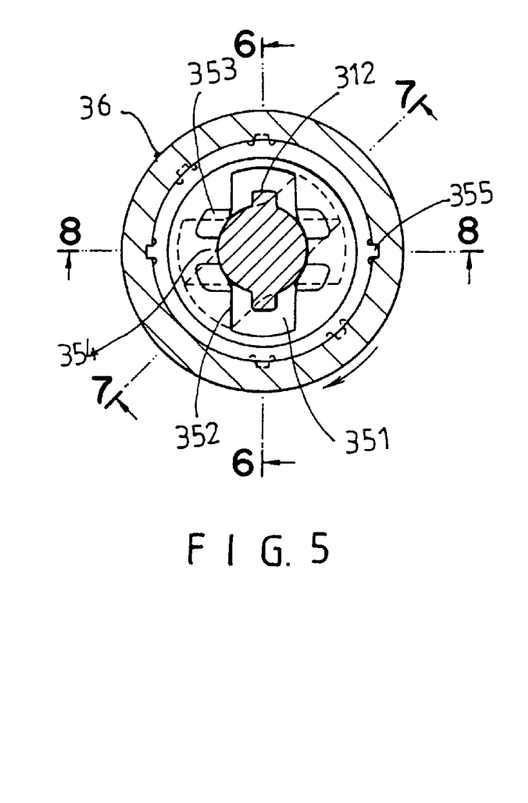
FIG. 5 is a first sectional schematic view illustrating an annular retainer engaged with two protrusions of a first preferred embodiment in accordance with the present invention.
Figure 6:
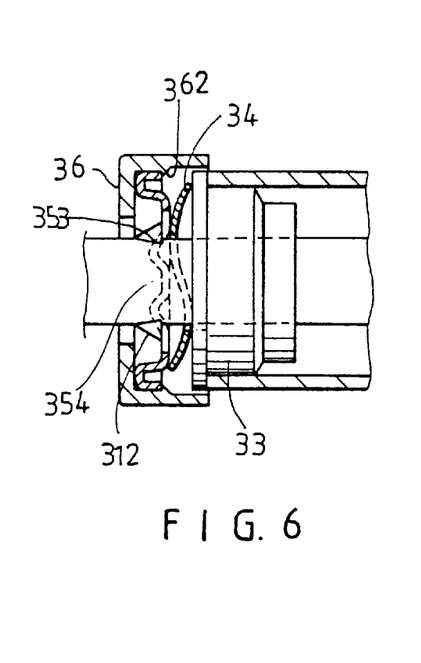
FIG. 6 is a second sectional schematic view illustrating an annular retainer engaged with two protrusions of a first preferred embodiment in accordance with the present invention.
Figure 7:
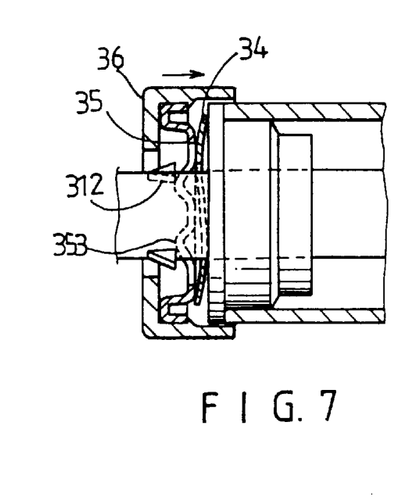
FIG. 7 is a third sectional schematic view illustrating an annular retainer engaged with two protrusions of a first preferred embodiment in accordance with the present invention.
Figure 8:
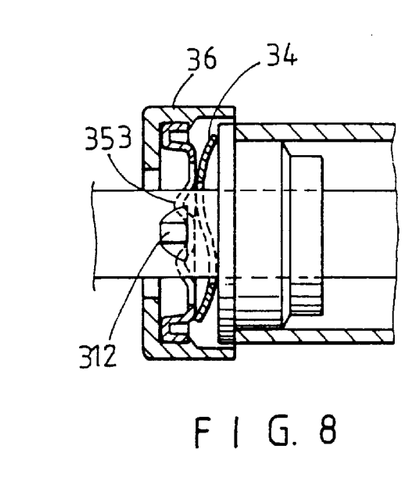
FIG. 8 is a fourth sectional schematic view illustrating an annular retainer engaged with two protrusions of a first preferred embodiment in accordance with the present invention.
Figure 9:
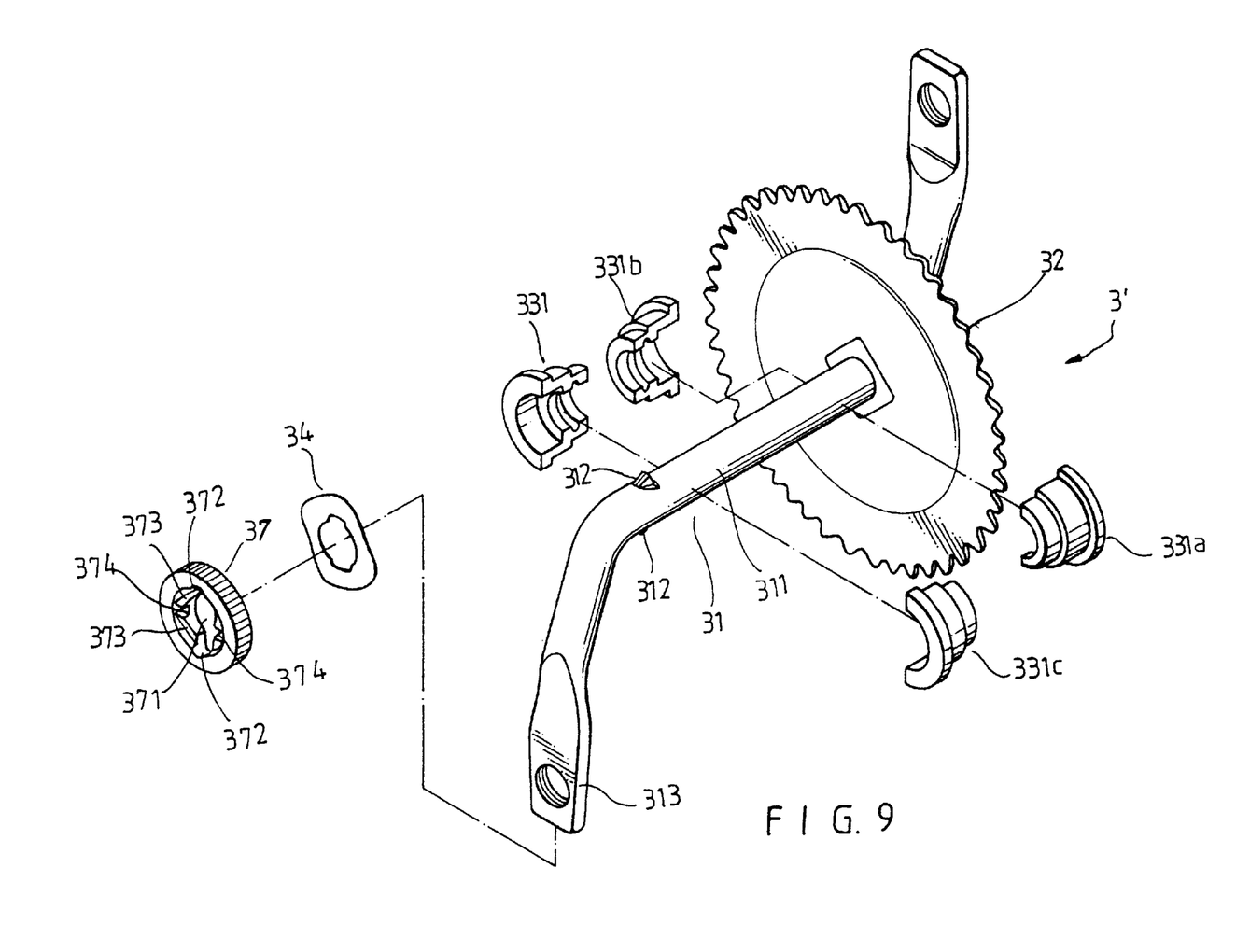
FIG. 9 is a perspective exploded view of a crankset device of a toy vehicle of a second preferred embodiment in accordance with the present invention.
Figure 10:
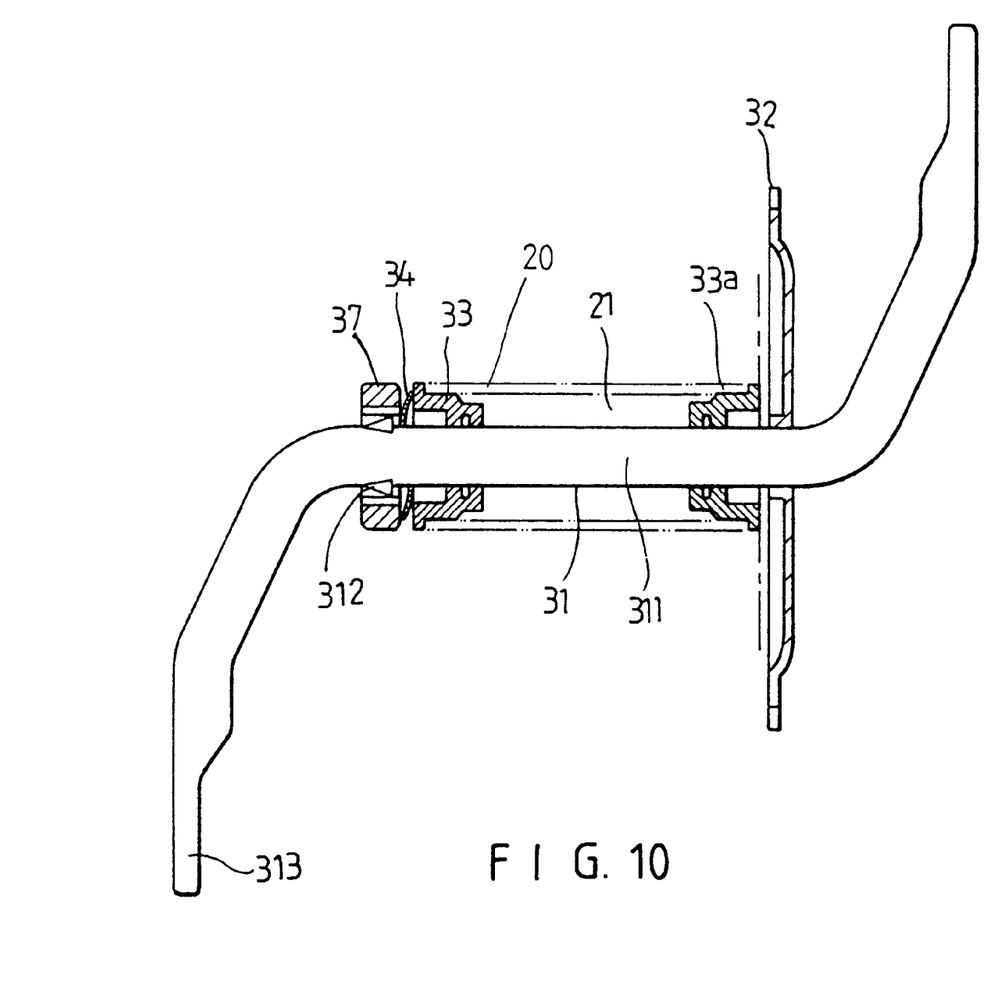
FIG. 10 is a sectional assembly view of a crankset device of a toy vehicle of a second preferred embodiment in accordance with the present invention.
Figure 11:
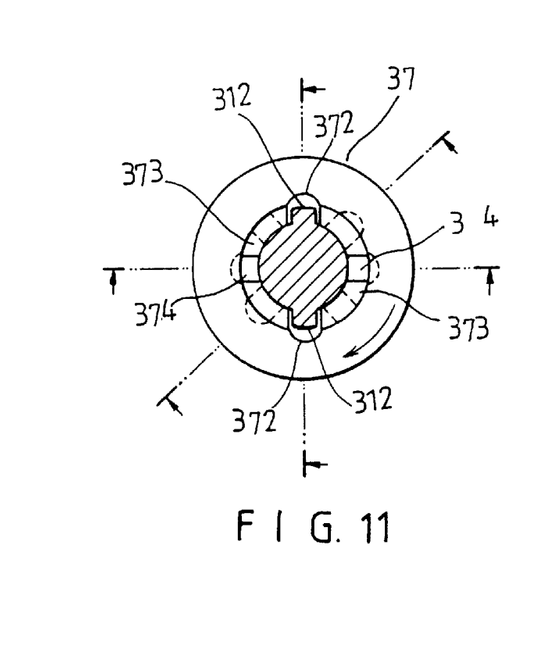
FIG. 11 is a first sectional schematic view illustrating an annular retainer engaged with two protrusions of a second preferred embodiment in accordance with the present invention.
Figure 12:
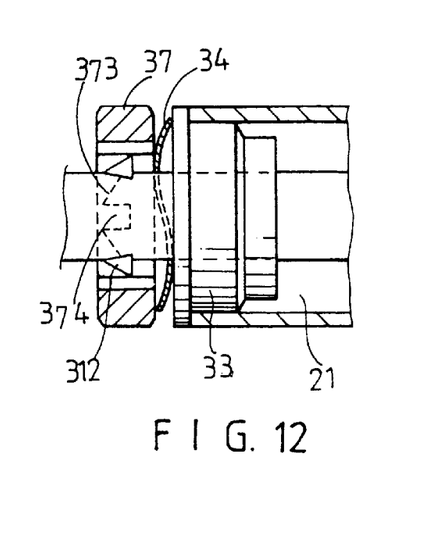
FIG. 12 is a second sectional schematic view illustrating an annular retainer engaged with two protrusions of a second preferred embodiment in accordance with the present invention.
Figure 13:
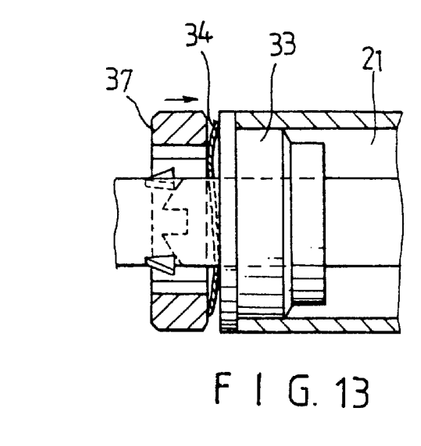
FIG. 13 is a third sectional schematic view illustrating an annular retainer engaged with two protrusions of a second preferred embodiment in accordance with the present invention.
Figure 14:
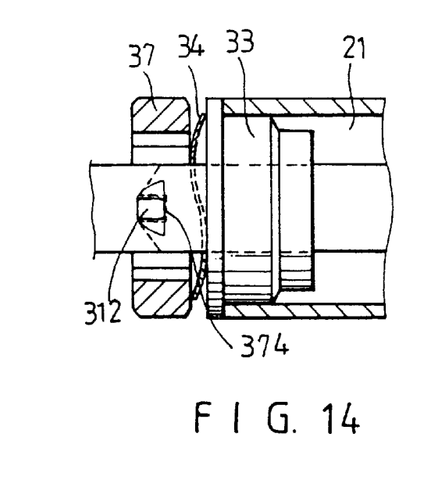
FIG. 14 is a fourth sectional schematic view illustrating an annular retainer engaged with two protrusions of a second preferred embodiment in accordance with the present invention.

Referring to FIGS. 1 and 2, a conventional crankset device 1 of a toy vehicle comprises a chain ring 12 having an inner disk 121, a tube 20' connected to the chain ring 12, the tube 20' having a hollow interior 21', and a crank arm 11 passing through a center of the chain ring 12, the hollow interior 21' of the tube 20', a first annular pad 13, a first annular collar 14, a second annular collar 14a, a second annular pad 13a, an elastic washer 15, a third annular pad 13b, and an annular cover 16. The first annular pad 13 engages with the first annular collar 14. The first annular pad 13 and the first annular collar 14 are disposed in a first end portion of the tube 20'. The second annular collar 14a is disposed in a second end portion of the tube 20'. The second annular pad 13a is inserted in the second annular collar 14a. The annular cover 16 covers the second end portion of the tube 20'. The third annular pad 13b is inserted in the annular cover 16. The elastic washer 15 is disposed between the second annular pad 13a and the third annular pad 13b. The first annular collar 14 has a first center hole 141. The second annular collar 14a has a second center hole 141a. The crank arm 11 has a distal end 113 and an aperture 111 receiving a pin 112. However, the conventional crankset device 1 has too many elements to be assembled.

SUMMARY OF THE INVENTION

An object of the present invention is to provide a crankset device which can be assembled easily.

Another object of the present invention is to provide a crankset device which is safe.

Accordingly, a crankset device comprises a chain ring, a tube connected to the chain ring, the tube having a hollow interior, and a crank arm passing through a center of the chain ring, the hollow interior of the tube, an elastic washer, and an annular retainer. The crank arm has a distal end, a middle portion, and at least a protrusion disposed on the middle portion. A first semicircular collar couples with a second semicircular collar. The first semicircular collar and the second semicircular collar surrounds the crank arm. A third semicircular collar couples with a fourth semicircular collar. The third semicircular collar and the fourth semicircular collar surrounds the crank arm. The first semicircular collar and the second semicircular collar are disposed in a first end portion of the tube. The third semicircular collar and the fourth semicircular collar are disposed in a second end portion of the tube. The elastic washer is disposed between the annular retainer, and the third semicircular collar and the fourth semicircular collar.

DETAILED DESCRIPTION OF THE INVENTION

Referring to FIGS. 3 to 8, a first crankset device 3 comprises a chain ring 32, a tube 20 connected to the chain ring 32, the tube 20 having a hollow interior 21, and a crank arm 31 passing through a center of the chain ring 32, the hollow interior 21 of the tube 20, an elastic washer 34, an annular retainer 35, and an annular cover 36. The crank arm 31 has a distal end 313, a middle portion 311, and two protrusions 312 disposed on the middle portion 311. A first collar set 33a surrounds the crank arm 31. The first collar set 33a has a first semicircular collar 331b and a second semicircular collar 331a coupling with the first semicircular collar 331b. A second collar set 33 surrounds the crank arm 31. The second collar set 33 has a third semicircular collar 331b and a fourth semicircular collar 331c coupling with the third semicircular collar 331b. The first collar set 33a is disposed in a first end portion of the tube 20. The second collar set 33 is disposed in a second end portion of the tube 20. The annular cover 36 covers the second end portion of the tube 20. The annular retainer 35 is inserted in the annular cover 36. The elastic washer 34 is disposed between the second collar set 33 and the annular retainer 35.

The annular retainer 35 comprises a center hole 351, two protruded blocks 355 disposed on the annular retainer 35, two bevels 353 disposed in an inner periphery 352 of the annular retainer 35, and at least a positioning groove 354 communicating with the center hole 351.

The annular cover 36 comprises a through hole 361 and an inner flange 362. The protruded blocks 355 engage with the inner flange 362.

Referring to FIGS. 9 to 14, a second crankset device 3' comprises a chain ring 32, a tube 20 connected to the chain ring 32, the tube 20 having a hollow interior 21, and a crank arm 31 passing through a center of the chain ring 32, the hollow interior 21 of the tube 20, an elastic washer 34, and an annular retainer 37. The crank arm 31 has a distal end 313, a middle portion 311, and at least a protrusion 312 disposed on the middle portion 311 of the crank arm 31. A first collar set 33a surrounds the crank arm 31. The first collar set 33a has a first semicircular collar 331 and a second semicircular collar 331a. A second collar set 33 surrounds the crank arm 31. The second collar set 33 has a third semicircular collar 331b and a fourth semicircular collar 331c. The first collar set 33a is disposed in a first end portion of the tube 20. The second collar set 33 is disposed in a second end portion of the tube 20. The elastic washer 34 is disposed between the annular retainer 37, and the third semicircular collar 331b and the fourth semicircular collar 331c.

The annular retainer 37 comprises a center hole 371, at least a bevel 373 disposed in an inner periphery 372 of the annular retainer 37, and at least a positioning groove 374 communicating with the center hole 371.

Figure 15:
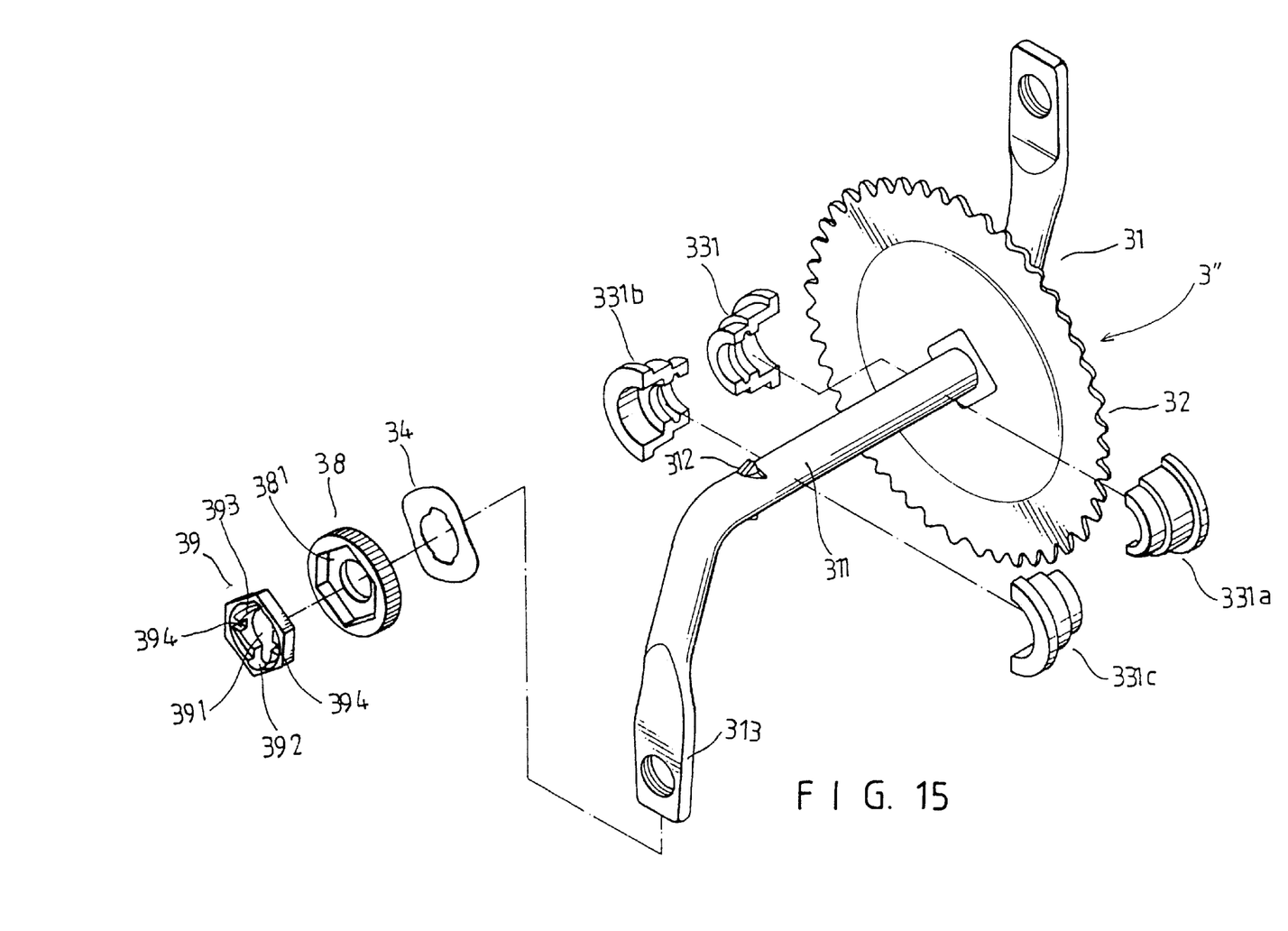
FIG. 15 is a perspective exploded view of a crankset device of a toy vehicle of a third preferred embodiment in accordance with the present invention.

Referring to FIG. 15, the annular retainer 35 and the annular cover 36 in the first preferred embodiment can be replaced by an annular seat 38 and a hollow, annular hexagonal retainer 39. The annular seat 38 has a hexagonal recess 381 receiving the hexagonal retainer 39. The hexagonal retainer 39 comprises a center hole 391, at least a bevel 393 disposed in an inner periphery 392 of the hexagonal retainer 39, and at least a positioning groove 394 communicating with the center hole 391. The hexagonal retainer 39 is inserted in the annular seat 38.

The invention is not limited to the above embodiment but various modification thereof may be made. Further, various changes in form and detail may be made without departing from the scope of the invention.

I claim:

1. A crankset device comprising, in combination:

a chain ring, a tube having a hollow interior, a crank arm passing through a center of the chain ring, the hollow interior of the tube, an elastic washer, and an annular retainer, the crank arm having a distal end, a middle portion, and at least a protrusion disposed on the middle portion, a first semicircular collar coupling with a second semicircular collar, the first semicircular collar and the second semicircular collar surrounding the crank arm, a third semicircular collar coupling with a fourth semicircular collar, the third semicircular collar and the fourth semicircular collar surrounding the crank arm, the first semicircular collar and the second semicircular collar disposed in a first end portion of the tube, the third semicircular collar and the fourth semicircular collar disposed in a second end portion of the tube, the annular retainer comprises a center hole, at least a bevel disposed in an inner periphery of the annular retainer, and at least a positioning groove communicating with the center hole for engaging with the protrusion of the crank arm, the elastic washer disposed between the annular retainer, and the third semicircular collar and the fourth semicircular collar, and an annular cover for covering the second end portion of the tube, wherein the annular retainer further comprises, in combination: at least a protruded block; and wherein the annular cover includes an inner flange engaged with the protruded block.

2. A crankset device as claimed in claim 1, wherein the annular retainer is disposed between the elastic washer and the annular cover.

3. A crankset device comprising, in combination:

a chain ring, a tube having a hollow interior, a crank arm passing through a center of the chain ring, the hollow interior of the tube, an elastic washer, and an annular retainer, the crank arm having a distal end, a middle portion, and at least a protrusion disposed on the middle portion, a first semicircular collar coupling with a second semicircular collar, the first semicircular collar and the second semicircular collar surrounding the crank arm, a third semicircular collar coupling with a fourth semicircular collar, the third semicircular collar and the fourth semicircular collar surrounding the crank arm, the first semicircular collar and the second semicircular collar disposed in a first end portion of the tube, the third semicircular collar and the fourth semicircular collar disposed in a second end portion of the tube, the annular retainer comprises a center hole, at least a bevel disposed in an inner periphery of the annular retainer, and at least a positioning groove communicating with the center hole for engaging with the protrusion of the crank arm, the elastic washer disposed between the annular retainer, and the third semicircular collar and the fourth semicircular collar, and an annular cover for covering the second end portion of the tube, wherein the annular cover includes a recess for receiving the retainer, wherein the recess is a hexagonal recess and the annular retainer is a hexagonal retainer, and wherein the annular cover is disposed between the annular retainer and the elastic washer.

* * * * *